June 23, 1931. A. C. GILBERT 1,811,499
MIXING APPARATUS
Filed March 17, 1928
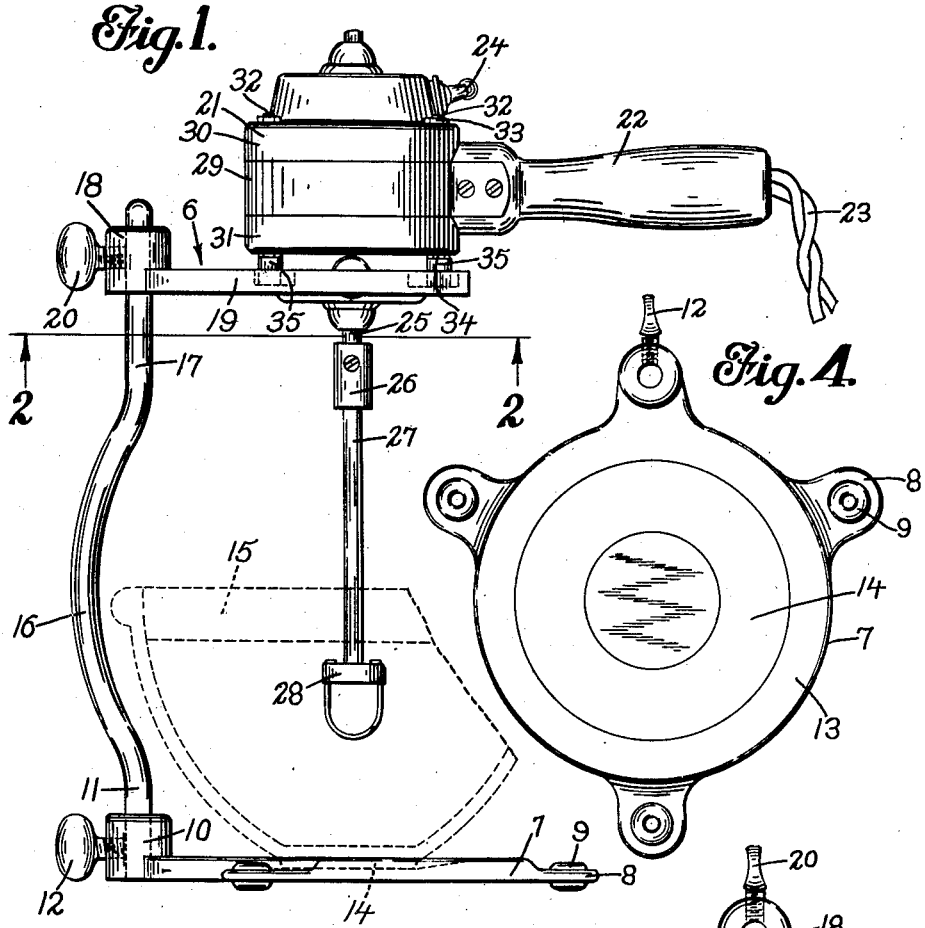

Patented June 23, 1931

1,811,499

UNITED STATES PATENT OFFICE

ALFRED C. GILBERT, OF HAMDEN, CONNECTICUT, ASSIGNOR TO THE A. C. GILBERT COMPANY, OF NEW HAVEN, CONNECTICUT

MIXING APPARATUS

Application filed March 17, 1928. Serial No. 262,539.

My invention relates to a mixer, and more particularly to a beverage or like mixer provided with a rotary agitating or stirring element adapted to be inserted into a liquid or semi-liquid, and by rotary movement of the element to mix, stir or beat the several ingredients of the beverage or other liquid or semi-liquid.

In a more specific aspect, my invention relates to that form of mixing apparatus in which an electric motor or other power means is provided supported above a container for the liquid or semi-liquid to be mixed or stirred, and in which the agitating or stirring element is connected to the motor shaft. As a primary object of my invention I contemplate an inexpensive, efficient and readily portable mixing apparatus of the type referred to in which the motor and mixing element are more efficiently supported than in similar devices heretofore known or used.

As another object of my invention, I contemplate a mixer of the above type which may be used in connection with a support or which may be held in the hand of the user.

Still another object of the invention resides in a novel means for absorbing motor and other vibrations in order to bring about an apparatus in which the usual and objectionable noise accompanying the operation of such machines is eliminated.

A further object of the invention resides in a simple means for preventing rotational displacement of the motor on the motor support or standard during the operation of the mixer.

To these and other ends, the invention consists in the novel features and combination of parts to be hereinafter described and claimed.

In the drawings:

Fig. 1 is an elevational view of a mixer according to my invention;

Fig. 2 is a sectional view along line 2—2 of Fig. 1;

Fig. 3 is a sectional view along line 3—3 of Fig. 1;

Fig. 4 is a plan view of the base of the mixer shown in Fig. 1; and

Fig. 5 is a plan view of the motor supporting element of the mixer shown in Fig. 1.

I will now describe my invention in connection with the preferred embodiment thereof shown in the drawings, although it will be understood as the description thereof proceeds that the invention is not limited to the precise type of stand or support shown in the drawings, but it may be used with other and different types of supports. Referring then to the drawings in which I have shown this preferred embodiment of my invention, the reference numeral 6 indicates, in general, a mixer which is provided with a substantially flat base 7, somewhat circular in outline, and having a plurality of outwardly extending feet 8 provided with resilient inserts 9 and a hollow boss 10, for the reception of upright post 11, which is secured in boss 10 by means of thumb screw 12, base 7 being provided in its upper face 13 with a depression 14 for the reception of a container or receptacle 15. Post 11 is bowed outwardly at an intermediate point 16 to provide clearance for various types of receptacles and at its upper end is provided with a relatively long straight portion 17 on which is adjustably received a boss 18 of motor supporting bracket 19, bracket 19 being secured at any desired distance above base 7 by means of thumb screw 20. Supported on bracket 19, in a manner to be hereinafter fully described, is a vertical motor 21 provided with a handle 22, through which wires 23 may pass to an interior part of the motor, a switch 24, for controlling the operation of the motor, and a downwardly extending shaft 25. Secured to shaft 25 by means of coupling 26 is a shaft 27 having on the lower end thereof a mixing element 28 which herein is of the same form as that disclosed and claimed in my prior application No. 202,927, filed July 1, 1927, and since the specific details of this element do not form a part of the present invention it will not be described herein in detail.

One of the features of my invention resides in a novel means for supporting the motor on its support or stand in which the motor and stirring element may be readily separated from and mounted on the stand without the usual care necessary in similar devices, and another feature resides in a novel arrangement of resilient vibration absorbing element interposed between the motor and its support, in the present instance the bracket 19. In my preferred form I take advantage of certain of the structural details of the motor in bringing about a simple means for carrying out these features of my invention. The motor 21 is provided with the usual motor casing 29 and end bearing supports 30 and 31, which are secured together by means of bolts, or threaded rods 32, passing through each of the bearing supports 30 and 31 and the casing 29, nuts 33 and 34 being provided at the opposite ends of the rods 32 to secure the bearing supports to the casing. The lower ends of rods 32 extend downwardly from support 31 a substantial distance and tightly received on these threaded ends are sleeves 35 of resilient material, such as rubber, the sleeves 35 being somewhat longer than the extended threaded ends of rods 32.

The bracket 19 is provided with a pair of oppositely disposed arms 36 and 37, which when the motor 31 is supported on bracket 19 are spaced from but embrace the adjacent parts of the motor, in the present instance the arms 36 and 37 being curved outwardly at 38 and 39 to clear the brush holders 40 and 41. On the upper ends of arms 36 and 37 are pockets 42 and 43 for the reception of sleeves 35, when the motor is supported on bracket 19, while at an opposite point on bracket 19 are a similar pair of pockets 44 and 45 for the remaining sleeves 35.

In operation, the stirring element may be raised a sufficient distance from the base 7 to place a receptacle thereon, by grasping the handle 22 and separating the motor from the motor bracket 19, whereupon the motor may be replaced on the bracket 19 with the flexible sleeves 35 received in the pockets 42, 43, 44 and 45, and the switch 24 may be tripped and the motor and stirring element brought into operation. When the liquid or semi-liquid in the receptacle has been agitated or stirred to the required degree, the motor may be stopped and again separated from the bracket 19 in order to remove the receptacle.

The usual noise accompanying the use of a mixer results from the fact that the top of the table, or other supporting structure, acts as a sounding board and greatly amplifies the vibrations of the motor and rotary beating or mixing element. By having the motor spaced from its support and by interposing a resilient element or elements between the motor and its support, I effectively prevent such vibrations from being communicated to the motor support and to the table. It will be readily understood that the motor may be separated from and supported on the stand without the care necessary in adjusting the motor to the stand as is necessary in the usual mixer. The preferred means, described herein as a resilient element in connection with the pockets provided in the supporting bracket, prevents rotational displacement of the mixer on its stand, in addition to absorbing the vibrations of the motor.

In certain aspects, the present invention may be considered to be an improvement on the mixing apparatus shown and described in my prior application No. 86,242, filed February 5, 1926, and such features as are common to both applications are claimed in the prior application referred to.

While I have shown and described a preferred embodiment of my invention, it will be understood that it is not to be limited to all the details shown, but is capable of modification and variation within the spirit of the invention and the scope of the appended claims.

What I claim is:

1. In a beverage mixer or the like, a motor, a mixing element carried by said motor and a motor support, said support being provided with an opening through which said mixing element projects, and means for supporting said motor in said opening in spaced relation to the motor support, said means positively preventing rotational displacement of the motor on the support, said motor being freely movable away from said support in an upward direction without interference from said positive means.

2. In a beverage mixer or the like, a motor, a handle for the motor, a mixing element carried by said motor and a motor support, said support being provided with an opening through which said mixing element projects, and means for supporting said motor in said opening in spaced relation to the motor support, said means engaging said support at a plurality of spaced points and adapted to be positioned on said support when said handle occupies a predetermined position with respect to the motor support.

3. In a beverage mixer or the like, a motor, a mixing element carried by said motor and a motor support, said support being provided with an opening through which said mixing element projects, and means for supporting said motor in said opening in spaced relation to the motor support, said means preventing rotational displacement of said motor on said support.

4. In a beverage mixer or the like, a motor, a mixing element driven by said motor, and a motor support, said support including a pair of oppositely disposed arms which underlie said motor when the latter is carried on the support, and means for supporting said motor on said arms in spaced relation thereto, said means being adapted to prevent rotational displacement of the motor on the arms.

5. In a beverage mixer or the like, a motor located above a receptacle, a mixing element driven by said motor and extending down into the receptacle, and a motor support, said support including a pair of oppositely disposed arms which underlie the motor when the motor is supported on said support, a plurality of depending motor supporting elements on said motor at its lower part, and a plurality of pockets in said arms at their upper faces in which said elements are received, said elements positioning the motor above said support in spaced relation thereto.

6. In a beverage mixer or the like, a stand, an electric motor supported by said stand and freely detachable therefrom, a mixing element driven by said motor, a plurality of supporting elements on said motor, and resilient means interposed between said elements and said stand.

7. In a beverage mixer or the like, a supporting element, a motor element supported by said first named element and freely detachable therefrom, a depending mixing element driven by said motor element, a plurality of resilient members interposed between said motor and stand, and means received within said members for securing said members to one of said elements.

8. In a beverage mixer or the like, a stand, a motor supported by said stand, a mixing element driven by said motor, a plurality of pockets in said stand, a plurality of resilient sleeves one in each of said pockets, and means for securing said sleeves to said motor, said motor being freely detachable from said stand.

9. In a beverage mixer or the like, a stand, a motor supported by said stand, said motor being provided with a casing and bearing supports on either end of said casing, threaded rods passing through said supports and casing, and resilient sleeves on the ends of said rods, said sleeves being interposed between the motor and the motor support.

10. In a beverage mixer or the like, a stand, a motor supported by said stand, said motor being provided with a casing and bearing supports on either end of said casing, threaded rods passing through said supports and casing, and resilient sleeves on the ends of said rods, said sleeves being interposed between the motor and the motor support, and a plurality of pockets in the motor support, one for each of said sleeves.

11. The combination with a motor member having a vertical shaft and a casing, said shaft extending downward beyond the casing, of a detachable stand for said motor member, a depending peripheral member secured to said motor member, and resting on a portion of the upper surface of said stand to support the motor thereon, and means on the stand lying in the path of said depending member to limit the turning movement of the motor on the stand.

12. In mixing apparatus or the like, a stand having a horizontally projecting bracket, an electric motor having its shaft disposed vertically, said motor being located above said bracket in spaced relation thereto, a handle on said motor, a mixing element driven by said motor shaft and disposed below said bracket, and means interposed between the upper face of said bracket and the lower face of the motor for supporting the motor in such upwardly spaced relation to the bracket, the motor being freely movable vertically in an upward direction away from the bracket.

13. In mixing apparatus or the like, a stand having a horizontally projecting bracket, an electric motor having its shaft disposed vertically, said motor being located above said bracket in spaced relation thereto, a handle on said motor, a mixing element driven by said motor shaft and disposed below said bracket, and means interposed between the upper face of said bracket and the lower face of the motor for supporting the motor in such upwardly spaced relation to the bracket, the motor being freely movable vertically in an upward direction away from the bracket, said interposed means being permanently connected to the motor casing and liftable therewith.

14. In mixing apparatus or the like, a stand having a horizontally projecting bracket, an electric motor having its shaft disposed vertically, said motor being located above said bracket in spaced relation thereto, a handle on said motor, a mixing element driven by said motor shaft and disposed below said bracket, means interposed between the upper face of said bracket and the lower face of the motor for supporting the motor in such upwardly spaced relation to the bracket, the motor being freely movable vertically in an upward direction away from the bracket, and means on the upper face of the bracket lying in the path of said interposed means to limit the turning movement of the motor when supported on said bracket.

15. In mixing apparatus, a stand including a horizontally projecting bracket provided with an opening to clear a motor shaft and with pockets on its upper face adjacent the edge of said opening, an electric motor located above the upper face of the bracket and provided with a handle, a shaft associated with said motor disposed in said opening, and means associated with the lower face portion of the motor casing presenting supporting feet projecting downwardly into said pockets and resting therein to support the motor on top of the bracket so that it is freely liftable therefrom but limited in its turning movement.

16. In a mixing apparatus or the like, a stand having a horizontally projecting bracket, an electric motor having its shaft disposed vertically, a mixing element driven by said motor shaft and disposed below said bracket when in operative position, and downwardly projecting motor supporting means mounted on said motor, said means being adapted to enter a part of said bracket to support the motor thereon out of contact with the bracket and against downward and rotational movements but permitting the motor to be freely movable vertically upwardly away from the bracket at all times.

17. In mixing apparatus, a receptacle-supporting stand having at one side a horizontally and inwardly projecting bracket, an electric motor having its shaft disposed vertically, a mixing element driven by said motor shaft and disposed below said bracket when in operative position, and downwardly projecting motor-supporting means mounted on said motor at the lower part thereof, said bracket being socketed to receive said means when lowered thereinto and the socketed part being shaped to cooperate with said motor-supporting means so as to support the motor against downward and rotational movements but permitting it to be freely movable vertically upwardly away from the bracket at all times.

18. In mixing apparatus, a stand having a horizontally projecting bracket, an electric motor having its shaft disposed vertically, a mixing element driven by said motor shaft and when in operative position disposed below said bracket, and means interposed between a face of the motor at its lower part and the bracket and depending from the motor for supporting the motor from the bracket in spaced relation thereto, said bracket having socketed means engaging and confining said motor-supporting means so as to hold the motor from turning with respect to the bracket but permitting the motor to be freely lifted from the bracket.

19. In mixing apparatus, a stand having a laterally projecting bracket, an electric motor having its shaft disposed vertically, a mixing element driven by said motor shaft and disposed below said bracket when in operative position, and downwardly extending motor-supporting means mounted on and depending from a face of the motor at its lower part, said means depending from the peripheral part of said motor at said face, said bracket being shaped to receive and enclose said means when the latter is lowered into the bracket for supporting the motor against forward and rotational movements while permitting upward movement of the motor at all times.

In witness whereof, I have hereunto set my hand this 14th day of March, 1928.

ALFRED C. GILBERT.

CERTIFICATE OF CORRECTION.

Patent No. 1,811,499.                                        Granted June 23, 1931, to

ALFRED C. GILBERT.

It is hereby certified that error appears in the printed specification of the above numbered patent requiring correction as follows: Page 4, lines 53 and 54, claim 19, for the word "forward" read downward; and that the said Letters Patent should be read with this correction therein that the same may conform to the record of the case in the Patent Office.

Signed and sealed this 4th day of August, A. D. 1931.

(Seal)                                                   Wm. A. Kinnan,
Acting Commissioner of Patents.